United States Patent [19]

Vandenberg

[11] 4,211,670

[45] Jul. 8, 1980

[54] TITANIUM TRICHLORIDE CATALYST COMPONENT FOR PROPYLENE POLYMERIZATION

[75] Inventor: Edwin J. Vandenberg, Wilmington, Del.

[73] Assignee: Hercules Incorporated, Wilmington, Del.

[21] Appl. No.: 6,970

[22] Filed: Jan. 25, 1979

[51] Int. Cl.² ............................................. C08F 4/64
[52] U.S. Cl. ........................... 252/429 B; 526/139; 526/140; 526/141; 526/142; 526/143
[58] Field of Search .................................. 252/429 B

[56] References Cited

U.S. PATENT DOCUMENTS

| | | | |
|---|---|---|---|
| 3,825,524 | 7/1974 | Wada et al. | 252/429 B X |
| 3,960,765 | 6/1976 | Shiga et al. | 252/429 B |
| 4,062,804 | 12/1977 | Ueno et al. | 252/429 B |
| 4,064,069 | 12/1977 | Ueno et al. | 252/429 B |
| 4,111,836 | 9/1978 | Karayannis et al. | 252/429 B |
| 4,127,504 | 11/1978 | Ueno et al. | 252/429 B |
| 4,127,505 | 11/1978 | Ueno et al. | 252/429 B |
| 4,136,243 | 1/1979 | Appleyard et al. | 252/429 B X |

FOREIGN PATENT DOCUMENTS 1391067  4/1975  United Kingdom .

*Primary Examiner*—Patrick Garvin
*Attorney, Agent, or Firm*—John W. Whitson

[57] ABSTRACT

An improved titanium trichloride catalyst component is prepared by treating a crude titanium trichloride composition with two different electron donor compounds via successive treatment with first one of the donor compounds and then with the other. The treated composition provides greater stereospecificity in the polymerization and copolymerization of propylene.

10 Claims, No Drawings

TITANIUM TRICHLORIDE CATALYST COMPONENT FOR PROPYLENE POLYMERIZATION

This invention relates to the polymerization and copolymerization of propylene using an improved catalyst. More particularly, it relates to an improved titanium trichloride composition and the process of preparing and using it. This composition provides greater stereospecificity when used as a catalyst component in the polymerization and copolymerization of propylene.

Catalysts of the Ziegler type are widely used for polymerizing propylene. For the preparation of crystalline polymers, the catalysts most commonly used are those composed of (a) a solid titanium trichloride component, and (b) an organoaluminum compound. Such catalysts have found wide commercial use but the art has nevertheless sought ways to improve their activity, efficiency and stereospecificity, that is, the ability of the catalyst to produce a polymer having a high degree of crystallinity with minimum production of amorphous polymer.

In accordance with this invention, it has now been found that a titanium trichloride composition of improved stereospecificity for use as a catalyst component in the polymerization and copolymerization of propylene can be prepared by treating a crude titanium trichloride composition, prepared by reducing titanium tetrachloride with an organoaluminum compound, usually in an inert diluent, with two different electron donor compounds via successive treatment with first one of said donor compounds and then the other in the other hereinafter specified. The first electron donor compound, hereinafter referred to as donor compound A, is a compound which is effective in removing residual aluminum compounds from the aforementioned crude titanium trichloride composition. The second electron donor compound, hereinafter referred to as donor compound B, is a compound which is different from donor compound A and is generally less effective than compound A in removing residual aluminum compounds from the crude titanium trichloride composition. Typical combinations of donor compounds A and B include, by way of example, diethyl ether and ethyl benzoate, di-n-butyl ether and ethyl benzoate, and diethyl ether and di-n-butyl thioether.

In contrast to the prior art, wherein it has been known to treat crude titanium trichloride compositions with an electron donor compound, the procedure of this invention employs successive treatments with two different electron donor compounds and thereby produces results that are not obtained by single treatment with one of the individual donor compounds or with mixtures of the donor compounds. Thus, the catalyst of this invention has a high polymerization activity and, when used in the polymerization of propylene, results in a total polymer product having an unusually low content of amorphous polymer. Another way of expressing the latter advantage is that the catalyst is very highly stereospecific in the polymerization of propylene.

The crude titanium trichloride composition to be used in this invention may be prepared by any of the following methods: (a) reduction of titanium tetrachloride with an organoaluminum compound at a temperature ranging from −80° C. to +80° C.; (b) reduction of titanium tetrachloride with an organoaluminum compound at a temperature ranging from 80° C. to 200° C.; or (c) reduction of titanium tetrachloride with an organoaluminum compound at a temperature below 80° C., followed by heat treatment of the resulting precipitate. It is preferred to use a titanium trichloride composition prepared by either method (a) or (c). In any of the reduction procedures just specified, the organoaluminum compound may be either a compound having the general formula $R_{3-n}AlX_n$, wherein R is an alkyl group of 1 to 12 carbon atoms, preferably 1 to 6 carbon atoms, or an aryl group, preferably phenyl, X is a chlorine or bromine atom, and n is 0, 1 or 2; or it may be a blend of compounds providing a composition corresponding to the above formula, for instance, a blend of an organoaluminum compound and an aluminum halide; or it may be a composition of two or more kinds of organoaluminum compounds having a composition corresponding with the above formula.

Exemplary of the organoaluminum compounds used to reduce the titanium tetrachloride are the alkyl or aryl aluminum dihalides such as methyl aluminum dichloride, ethyl aluminum dichloride, propyl aluminum dichloride, n-butyl aluminum dichloride, isobutyl aluminum dichloride, hexyl aluminum dichloride, hexyl aluminum dibromide, phenyl aluminum dichloride and tolyl aluminum dichloride; the alkyl or aryl aluminum sesquihalides such as methyl aluminum sesquichloride, ethyl aluminum sesquichloride, n-butyl aluminum sesquichloride and phenyl aluminum sesquichloride; the dialkyl or diaryl aluminum halides such as dimethyl aluminum chloride, diethyl aluminum chloride, di-n-butyl aluminum chloride, dihexyl aluminum chloride, dihexyl aluminum bromide, diphenyl aluminum chloride and ditolyl aluminum chloride; and the trialkyl or triaryl aluminums such as triethyl aluminum, tri-n-propyl aluminum, triisopropyl aluminum, tri-n-butyl aluminum, triisobutyl aluminum and tri-n-hexyl aluminum. These compounds may be used singly or in the form of an admixture of two or more of the compounds. Use of alkyl aluminum sesquichlorides and alkyl aluminum dichlorides is preferred.

The titanium trichloride composition obtained by the reduction of titanium tetrachloride with an organoaluminum compound will contain an aluminum-containing substance, which is presumed to be aluminum chloride, $RAlX_2$ or $R_2AlX$, where R and X are as defined above. The reduced titanium trichloride composition will usually contain such aluminum-containing substance in an amount of from about 0.01 to about 1.0 mole calculated as aluminum atom per mole of the titanium, and this amount generally will be found when the molar ratio of aluminum compound to titanium tetrachloride is from about 0.1 to about 3.0.

The reduction of the titanium tetrachloride may be conducted in the absence of a diluent, but generally is carried out in the presence of an inert solvent, such as hexane, heptane, octane, kerosene, benzene, toluene, xylene, or similar hydrocarbons. These hydrocarbons also may be used in the preferred step of washing the titanium trichloride composition obtained from the reduction reaction prior to its being treated in accordance with the present invention. Alternatively, the titanium trichloride composition can be washed and then heat-treated, with or without a further washing.

In accordance with this invention, the crude titanium trichloride composition obtained as described above is successively treated, preferably in an inert diluent, first with donor compound A and then with donor compound B. The improvements achieved by such treatment can not be obtained by treatment with only one of the donor compounds or by simultaneous treatment with a mixture of the two. What occurs during the donor treatment procedure of this invention is not clear; nevertheless, substantial changes in the titanium trichloride composition take place, and these markedly affect the performance of the composition as a catalyst component in the polymerization and copolymerization of propylene.

Each of the donor compound treatments may be carried out at a temperature of from about room temperature up to the boiling point of the donor compound or of the inert diluent when a diluent is used. Generally, a temperature of from about 50° to about 150° C. is preferred, and the time involved in each treatment will range from about 15 minutes to about 100 hours. From a practical standpoint, an inert diluent is used, and the crude titanium trichloride is first suspended in such a diluent containing donor compound A, held in suspension for a sufficient length of time at the selected temperature, then separated from the treating liquid by decantation or filtration and washed one or more times with fresh diluent to remove the remaining traces of donor compound A. This procedure then is repeated with diluent containing donor compound B. Preferably the steps of washing with the inert diluent are carried out at a temperature equal to or higher than the treatment temperature.

Representative of the inert diluents which are useful in the treatment of the crude titanium trichloride with the donor compounds in accordance with this invention are the saturated aliphatic hydrocarbons having from three to 20 carbon atoms, such as propane, butane, pentane, hexane, 3-methylpentane, 2,3-dimethylbutane, n-heptane, 2-methylhexane, n-octane, isooctane, n-decane, n-dodecane, heptadecane, n-eicosane and kerosene. Also useful are the aromatic hydrocarbons having from six to 20 carbon atoms, and these hydrocarbons may be substituted by alkyl radicals having from one to 20 carbon atoms, aralkyl radicals having from seven to 15 carbon atoms or aryl radicals having from six to eight carbon atoms. Exemplary of these aromatic compounds are benzene, toluene, xylene, ethylbenzene, cumene, cymene, trimethylbenzene, tetramethylbenzene, diphenyl, diphenylmethane, diphenylethane, naphthalene, alpha-methylnaphthalene, beta-methylnaphthalene and 2,6-dimethylnaphthalene. Additionally, those halogenated aromatic hydrocarbons having from six to 16 carbon atoms may be used, for example, chlorobenzene, bromobenzene, iodobenzene, fluorobenzene, p-dichlorobenzene, p-dibromobenzene, 1,2,4,5-tetrachlorobenzene, hexachlorobenzene, pentabromobenzene, p-bromotoluene, 2-chloro-m-xylene, 1-chloronaphthalene, 1-bromonaphthalene, 5-chlorotetraline, 2-bromodihydronaphthalene, 1-chloro-2-phenylnaphthalene, 1,4-dichloronaphthalene, and 2-chloroanthracene. Any of the inert diluents may be used singly or in admixture with each other, and the preferred diluents are the aliphatic hydrocarbons.

The donor compound A used in accordance with this invention is a dialkyl ether or thioether, a diaryl ether or thioether or an alkyl ether or thioether. In these compounds, each alkyl group will contain from one to ten carbon atoms and each aryl group will contain from six to twelve carbon atoms. Representative of the dialkyl compounds are the dimethyl, diethyl, di-n-propyl, diisopropyl, di-n-butyl, diisobutyl, diisoamyl, di-n-hexyl, di-n-octyl, diisooctyl, methyl ethyl, methyl n-butyl, and amyl n-butyl ethers and thioethers. Exemplary of the diaryl compounds are the diphenyl, ditolyl and naphthyl phenyl ethers and thioethers. The alkyl aryl compounds are exemplified by the methyl phenyl, methyl tolyl, methyl naphthyl, methyl p-butylphenyl, ethyl phenyl, ethyl tolyl, ethyl naphthyl and isopropyl phenyl ethers and thioethers.

Donor compound B may be an organic acid, an ester, an amide, a ketone, an ether, a nitrile, an amine, a sulfide, a sulfoxide, a sulfone, a phosphine, a phosphorous ester, or a metal coordinating hydrocarbon containing multiple double bonds. However, when donor compound B is a sulfide, more specifically a thioether, the thioether should not be used as donor compound B when donor compound A is a thioether. Similarly, if a thioether is used as donor compound B, a thioether should not be used as donor compound A. In other words, in the process of this invention, a thioether will be used in only one of the two donor treatments of the process.

Specific examples of the donor B compounds are the aromatic carboxylic acids containing seven to 12 carbon atoms, such as benzoic acid, toluic acid, phthalic acid and naphthoic acid; the alkyl and aryl esters of saturated or unsaturated aliphatic carboxylic acids, which may be substituted, wherein the esters contain four to 24 carbon atoms, for example, ethyl acetate, propyl acetate, butyl acetate, amyl acetate, methyl butyrate, butyl formate, methyl oleate, ethyl sorbate, methyl cinnamate, methyl methacrylate, butyl acrylate, and phenyl acetate; the alkyl and aryl esters of aromatic carboxylic acids, which may be substituted, wherein the esters contain eight to 24 carbon atoms, for example, methyl benzoate, phenyl benzoate, isoamyl benzoate, ethyl anisate, ethyl toluate, dioctyl phthalate, methyl m-chlorobenzoate, methyl o-fluorobenzoate and ethyl salicylate; alkyl alkanesulfonates such as methyl ethanesulfonate; alkyl arylsulfonates such as methyl benzenesulfonate; ketoesters such as ethyl acetoacetate and ethyl phenyl glyoxalate; chloroesters such as 2-chloroethyl chloroformate; and ortho esters such as trimethyl orthoacetate and trimethyl orthobenzoate.

Further examples of donor compound B are the N,N-dialkyl amides of saturated or unsaturated aliphatic carboxylic acids wherein the amides contain four to 24 carbon atoms, such as N,N-dimethyl acetamide, N,N-diethyl butyramide, N,N-dibutyl propionamide and N,N-diethyl stearamide; the N,N-dialkyl amides of aromatic carboxylic acids wherein the amides contain nine to 24 carbon atoms, such as N,N-dimethyl benzamide, N,N-diethyl toluamide, N,N-dibutyl caprylamide and N,N-dimethyl stearamide; and those amides which are N-alkyl lactams containing five to 15 carbon atoms, such as N-methyl pyrrolidone; aliphatic ketones, which may be substituted, wherein the ketones contain three to 15 carbon atoms, for example, acetone, methyl ethyl ketone, methyl isobutyl ketone, ethyl butyl ketone, dihexyl ketone, 1-chloro-3-pentanone, 1,3-dichloro-2-propanone, 1,1,3,3-tetrachloro-2-propanone, acetylacetone, 2,3-butanedione, acetonylacetone and 2-ethoxyethyl methyl ketone; aromatic ketones, which may be substituted, wherein the ketones contain eight to 15 carbon atoms, for example, acetophenone, ethyl phenyl ketone, butyl phenyl ketone, benzophenone, benzal acetophenone, cinnamyl methyl ketone, benzoin, anisoin, benzoin methyl ether, 1,3-diphenyl-1,3-propanedione, benzil, 1-phenyl-1,2-propanedione and naphthoquinone.

Donor compound B may also be a halogen-substituted dialkyl ether containing two to 20 carbon atoms, such as bis(2-chloroethyl) ether, a diether containing three to 20 atoms, such as dimethoxymethane, diethoxymethane and diphenoxyethane; a dialkyl thioether, sulfoxide, sulfone or disulfide containing two to 20 carbon atoms, such as diethyl, dibutyl or diamyl thioether and the corresponding sulfoxides, sulfones and disulfides; an aromatic sulfide, such as thiophene or a diaryl thioether containing 12 to 20 carbon atoms, such as diphenyl thioether, and the sulfoxides, sulfones and disulfides corresponding to such diaryl thioethers; a phosphite or phosphate ester or phosphine containing three to 21 carbon atoms, such as trimethyl phosphite, triethyl phosphite, tributyl phosphate, tritolyl phosphate, triisobutyl phosphine, triphenyl phosphine and ethyl diphenyl phosphine; or a metal coordinating hydrocarbon containing multiple double bonds, such as cycloheptatriene, 1,4-diphenyl butadiene and 1,1,4,4-tetraphenyl butadiene.

Additionally, donor compound B may be an aliphatic nitrile containing two to 12 carbon atoms, for example, acetonitrile, butyronitrile, isobutyronitrile, valeronitrile, acrylonitrile and 2-(dimethylamino)propionitrile; an aromatic nitrile containing seven to 12 carbon atoms, for example, benzonitrile, phthalonitrile, naphthonitrile and benzyl isonitrile; an aliphatic, including cycloaliphatic, amine containing one to 20 carbon atoms, for example, methyl amine, diethyl amine, dibutyl amine, triethyl amine, octyl amine, dodecyl amine, N,N,N',N'-tetramethyl ethylenediamine, quinuclidine, piperidine, N-methylpiperidine, N-ethyl piperidine, 2-methyl piperidine, 2,6-dimethyl piperidine, hexamethylene imine and N-methyl pyrrolidine; and a heterocyclic amine possessing aromatic characteristics and containing three to 15 carbons atoms, for example, pyrrole, N-methyl pyrrole, quinoline, isoquinoline, 2-methyl quinoline, 2,6-dimethyl pyridine, 2,6-di-t-butyl pyridine, imidazole, pyrazole, quinoxaline, quinazoline and 2,2'-dipyridyl.

The polymerization and copolymerization of propylene in accordance with this invention is conducted in the presence of (a) a modified titanium trichloride composition obtained as described above, and (b) an organoaluminum compound. Any of the organoaluminum compounds which are known as one component of Ziegler-type catalysts may be used. Examples of such organoaluminum compounds include the trialkyl aluminums, dialkylaluminum halides, dialkylaluminum alkoxides, alkylaluminum alkoxy halides, alkylaluminum dihalides, alkylaluminum sesquihalides, reaction products of alkylaluminum dihalides with alkali metal halides or alkali metal complex fluorides of transition metals, and reaction products of alkylaluminum dihalides with electron donors. Examples of such electron donors are those mentioned in, for example, U.S. Pat. Nos. 3,116,274 and 3,230,208. The dialkylaluminum chlorides are preferred organoaluminum compounds. Preferred monomers for copolymerization with propylene are ethylene, 1-butene, 4-methyl-1-pentene and 1-hexane.

The polymerization and copolymerization of propylene using the catalyst of this invention may be carried out under known conditions, such as temperatures of 20° to 150° C. and pressures from atmospheric to 200 atmospheres. An inert diluent ordinarily is used as a solvent, and the polymerization may be conducted either batchwise or continuously. Moreover, hydrogen may be used as an agent for controlling the molecular weight of the polymer. Upon completion of the polymerization reaction, the catalyst usually is deactivated with an alcohol such as methanol, ethanol, isopropanol or butanol, as is conventional with a Ziegler-type catalyst, but such deactivation may be omitted and the catalyst merely contacted with air, steam or hot water when the yield of polymer per unit amount of catalyst is large.

Now, having generally outlined the embodiments of the invention, the following examples constitute specific illustrations. All amounts are as given in the examples.

EXAMPLES 1 to 4

Titanium Trichloride Preparation

One thousand fifty-three grams of $TiCl_4$ (5.55 moles) was added to two liters of a liquid hydrocarbon diluent (a saturated paraffin of highly branched structure with a boiling range of 350°–370° F.) in a stirred reactor under nitrogen, and the resulting solution was cooled to 0° C. Subsequently, 4.47 liters of a solution of 24 weight percent ethylaluminum sesquichloride ($Et_3Al_2Cl_3$) in the liquid hydrocarbon diluent (3710 g., 3.61 moles, thus 0.65:1 $Et_3Al_2Cl_3$:$TiCl_4$ mole ratio) was added to the $TiCl_4$ solution, with stirring, over a period of four hours at 0° C. Stirring was continued for 10 hours more at 0° C., then the temperature was raised to 80° C. over a four-hour period and held at that temperature for an additional four hours. The reaction mixture was then allowed to settle and the supernatant liquid was removed. The resulting solids were resuspended in four liters of the liquid hydrocarbon diluent, stirred for 30 minutes, allowed to settle and the supernatant liquid removed. The solids were washed twice more in the same way and then were resuspended in five liters of the hydrocarbon diluent and heated 14 hours at 100° C. The suspension so obtained was then diluted with additional diluent to obtain a suspension which was about 0.5 M in titanium trichloride.

Electron Donor Treatment

Twenty milliliters of the above suspension, containing 10 millimoles of titanium trichloride, was placed in a pressure bottle under an atmosphere of nitrogen. Diethyl ether was added to the suspension at room temperature, the amount of ether being sufficient to provide a mole ratio of ether to titanium trichloride of 0.4. The bottle was then sealed and tumbled 16 hours at 80° C. The treated suspension was allowed to settle, and the liquid and solids then were separated by decantation. The solids were next suspended in heptane in an amount sufficient to provide a volume one and one-half times the volume of the original suspension. The heptane suspension was heated with agitation at 80° C. for 15 minutes, and the solids and liquid again were separated by settling and decantation. This washing procedure was repeated at least one more time. The washed solids were then suspended in heptane and to the resulting suspension was added an amount of di-n-butyl thioether sufficient to provide a mole ratio of the thioether to the titanium trichloride of 0.4. The same procedure as that used in the diethyl ether treatment then was followed, terminating in isolation of the treated titanium trichloride solids.

The above procedure for treatment of the crude titanium trichloride was repeated except to use a 0.7 mole ratio of the thioether. Treatments also were carried out in which, in one instance, the thioether was omitted and, in another instance, the ether was omitted.

Polymerization of Propylene

A glass polymerization vessel was charged, under an atmosphere of nitrogen, with the following ingredients in the amounts and order listed below:
400 ml. of purified n-hexane
2.5 millimoles of diethylaluminum chloride
0.4 millimole of the treated TiCl$_3$ composition (Ti$^{+3}$ basis)

The nitrogen was vented off and propylene was added to 37 p.s.i.g. at 70° C. Hydrogen was added incrementally six times throughout the polymerization period of four hours in the amount of 10 cc. of hydrogen per addition. During the polymerization, the propylene pressure was kept constant at 37 p.s.i.g. At the end of the polymerization, the excess propylene was vented off and both the dissolved and insoluble polymer were recovered and dried. The amount of polymer insoluble in the polymerization diluent is reported in terms of the percent insoluble. The amount of soluble polymer extractable from the diluent insoluble polymer using decahydronaphthalene (Decalin) as the solvent is reported in terms of the percent Decalin soluble. The Decalin extraction was carried out by placing one gram of the diluent insoluble polymer plus 200 ml. of Decalin containing 0.01% antioxidant in a nitrogen filled capped vessel and then, while stirring, dissolving the polymer at 145° C., cooling to 23°-25° C., and permitting the vessel contents to stand for 16 hours. The insoluble polymer so formed was then filtered off, and an aliquot of the filtrate was dried under nitrogen on a hot plate and then for two hours at 110° C. in an oven to recover the Decalin soluble polymer. The polymerization rate is reported in terms of Zieglers, that is, the number of grams of diluent insoluble polymer produced per hour per millimole of titanium per atmosphere of propylene. The data for these examples are given in Table I.

EXAMPLES 5 to 7

The procedure of Example 1 was duplicated except to use di-n-butyl ether instead of diethyl ether as donor compound A and ethyl benzoate instead of di-n-butyl thioether as donor compound B. The amount of di-n-butyl ether provided a mole ratio of ether to titanium trichloride of 1.2, and the amount of ethyl benzoate provided a mole ratio of 0.1. Treatments with the individual compounds also were carried out, as in Examples 3 and 4. The data for these examples are also given in Table I.

EXAMPLES 8 and 9

The procedure of Example 5 was repeated except to use di-n-butyl thioether instead of di-n-butyl ether as donor compound A. The amount of di-n-butyl thioether provided a mole ratio of thioether to titanium trichloride of 1.0. Treatment with the thioether alone also was carried out. The results of these examples are shown in Table I.

EXAMPLES 10 to 24

The procedure of Example 5 was repeated except to use a number of different donor compounds B in place of ethyl benzoate. The results from these examples are shown in Table II.

EXAMPLE 25

This example illustrates simultaneous treatment of the crude titanium trichloride composition with a mixture of donor compounds A and B. The procedure of Example 5 was followed except that the ethyl benzoate was added to the suspension of titanium trichloride along with the di-n-butyl ether. The propylene polymerization data obtained with the titanium trichloride composition treated in this manner showed a rate of 18.3 Zieglers, a diluent insoluble content of 95.4% and a Decalin soluble content of 8.5%.

In the above examples, the mole ratio of donor compound A to titanium trichloride varied from 0.4 to 1.2 and the mole ratio of donor compound B to titanium trichloride ranged from 0.02 to 0.7. More generally, however, the mole ratio of donor compound A to titanium trichloride may be from about 0.2 to about 10, preferably from about 0.4 to about 5.0, and more preferably from about 0.4 to about 1.5. Similarly, the mole ratio of donor compound B to titanium trichloride may be from about 0.01 to about 15, preferably from about 0.02 to about 2.0, and more preferably from about 0.1 to about 1.0. In actual practice, the preferred amount of donor compound will depend upon the particular compound used.

Table I

| Example | Donor Compound A (mole ratio relative to TiCl$_3$) | Donor Compound B (mole ratio relative to TiCl$_3$) | Rate (Zieglers) | Diluent Insoluble (%) | Decalin Soluble (%) |
|---|---|---|---|---|---|
| 1 | 0.4 (C$_2$H$_5$)$_2$O | 0.4 (n-C$_4$H$_9$)$_2$S | 14.6 | 99.3 | 3.7 |
| 2 | 0.4 (C$_2$H$_5$)$_2$O | 0.7 (n-C$_4$H$_9$)$_2$S | 10.6 | 99.3 | 3.0 |
| 3 | 0.4 (C$_2$H$_5$)$_2$O | — | 9.6 | 91.7 | 9.8 |
| 4 (60° C.) | — | 0.6 (n-C$_4$H$_9$)$_2$S | 14.2 | 96.8 | 6.8 |
| 5 | 1.2 (n-C$_4$H$_9$)$_2$O | 0.1 ethyl benzoate | 22.3 | 98.3 | 6.0 |
| 6 | 1.2 (n-C$_4$H$_9$)$_2$O | — | 21.4 | 84.5 | — |
| 7 | — | 0.6 ethyl benzoate | 5.3 | 95.1 | 1.8 |
| 8 | 1.0 (n-C$_4$H$_9$)$_2$S | 0.1 ethyl benzoate | 18.4 | 99.4 | 3.6 |
| 9 | 1.0 (n-C$_4$H$_9$)$_2$S | — | 18.4 | 98.5 | 7.7 |

Table II

| Example | Donor Compound A (mole ratio relative to TiCl$_3$) | Donor Compound B (mole ratio relative to TiCl$_3$) | Rate (Zieglers) | Diluent Insoluble (%) | Decalin Soluble (%) |
|---|---|---|---|---|---|
| 10 | 1.2 (n-C$_4$H$_9$)$_2$O | 0.05 benzoic acid | 11.7 | 97.2 | 8.5 |
| 11 | " | 0.12 dimethyl benzamide | 15.0 | 98.1 | 5.5 |

Table II-continued

| Example | Donor Compound A (mole ratio relative to TiCl3) | Donor Compound B (mole ratio relative to TiCl3) | Polymerization Data | | |
|---|---|---|---|---|---|
| | | | Rate (Zieglers) | Diluent Insoluble (%) | Decalin Soluble (%) |
| 12 | " | 0.06 benzophenone | 16.0 | 97.0 | 8.3 |
| 13 | " | 0.25 (ClCH2CH2)2O | 14.0 | 98.2 | 8.2 |
| 14 | " | 0.05 1,2-diphenoxyethane | 17.4 | 98.5 | 5.7 |
| 15 | " | 0.05 dimethyl sulfoxide | 10.5 | 98.9 | 4.6 |
| 16 | " | 0.10 dibutyl sulfone | 10.9 | 98.3 | 4.7 |
| 17 | " | 0.05 dibutyl disulfide | 14.7 | 98.9 | 5.7 |
| 18 | " | 0.05 tributyl phosphine | 10.6 | 98.8 | 3.5 |
| 19 | " | 0.10 cycloheptatriene | 12.3 | 97.0 | 8.2 |
| 20 | " | 0.02 n-butyronitrile | 13.7 | 98.3 | 6.1 |
| 21 | " | 0.05 benzonitrile | 13.6 | 98.2 | 5.4 |
| 22 | " | 0.10 triethyl amine | 14.2 | 98.8 | 6.5 |
| 23 | " | 0.05 2,6-di-t-butyl pyridine | 13.0 | 98.7 | 4.9 |
| 24 | " | 0.12 quinoxaline | 14.1 | 98.7 | 6.7 |

What I claim and desire to protect by Letters Patent is:

1. A process for preparing a titanium trichloride composition of improved stereospecificity for use as a catalyst component in the polymerization of propylene, said process consisting essentially of the steps of 1) washing a crude titanium trichloride composition, prepared by reducing titanium tetrachloride with an organoaluminum compound, with an inert diluent, 2) suspending the washed titanium trichloride solids in an inert diluent containing a first electron donor compound, 3) maintaining said solids in suspension at a temperature of from about room temperature up to the boiling point of the diluent or the donor compound for a period of from about 15 minutes to about 100 hours, 4) separating the solids from the inert diluent containing the electron donor compound, 5) washing the separated solids with an inert diluent, and then 6) repeating steps 2, 3, 4 and 5 using a second electron donor compound in place of said first electron donor compound, said first electron donor compound being selected from the group consisting of dialkyl, diaryl and alkyl aryl ethers and thioethers wherein each alkyl group contains from one to ten carbon atoms and each aryl group contains from six to 12 carbon atoms, said second electron donor compound being selected from the group consisting of aromatic carboxylic acids containing seven to 12 carbon atoms; alkyl and aryl esters of aliphatic carboxylic acids, said esters containing four to 24 carbon atoms; alkyl and aryl esters of aromatic carboxylic acids, said esters containing eight to 24 carbon atoms; alkyl alkanesulfonates; alkyl arylsulfonates; ketoesters; chloroesters; ortho esters; N,N-dialkyl amides of aliphatic carboxylic acids, said amides containing four to 24 carbon atoms; N,N-dialkyl amides of aromatic carboxylic acids, said amides containing nine to 24 carbon atoms; N-alkyl lactams containing five to 15 carbon atoms; aliphatic ketones containing three to 15 carbon atoms; aromatic ketones containing eight to 15 carbon atoms; halogenated dialkyl ethers containing two to 20 carbon atoms; diethers containing three to 20 carbon atoms; dialkyl thioethers, sulfoxides, sulfones and disulfides containing two to 20 carbon atoms; aromatic sulfides or diaryl thioethers containing 12 to 20 carbon atoms; sulfoxides, sulfones and disulfides corresponding to said diaryl thioethers; phosphines and phosphite and phosphate esters containing three to 21 carbon atoms; metal coordinating hydrocarbons having multiple double bonds and containing seven to 28 carbon atoms; aliphatic nitriles containing two to 12 carbon atoms; aromatic nitriles containing seven to 12 carbon atoms; aliphatic amines containing one to 20 carbon atoms; and heterocyclic amines possessing aromatic characteristics and containing three to 15 carbon atoms, said inert diluent being selected from the group consisting of a) saturated aliphatic hydrocarbons having from three to 20 carbon atoms, b) aromatic hydrocarbons having from six to 20 carbon atoms, said aromatic hydrocarbons being either unsubstituted or substituted by alkyl radicals having from one to 20 carbon atoms, aralkyl radicals having from seven to 15 carbon atoms or aryl radicals having from six to eight carbon atoms, c) halogenated aromatic hydrocarbons having from six to 16 carbon atoms, and d) mixtures thereof, with the proviso that, when a thioether is used as either the first or the second electron donor compound in said process, a thioether is not also used as the other electron donor compound in the process.

2. The process of claim 1 wherein the first electron donor compound is a dialkyl ether wherein each alkyl group contains from one to ten carbon atoms.

3. The process of claim 2 wherein the dialkyl ether is diethyl ether.

4. The process of claim 2 wherein the dialkyl ether is di-n-butyl ether.

5. The process of claim 1 wherein the first electron donor compound is a dialkyl thioether wherein each alkyl group contains from one to ten carbon atoms.

6. The process of claim 5 wherein the dialkyl thioether is di-n-butyl thioether.

7. The process of claim 1 wherein the second electron donor compound is an alkyl ester of an aromatic carboxylic acid, said ester containing eight to 24 carbon atoms.

8. The process of claim 7 wherein said ester is ethyl benzoate.

9. A process of claim 1 wherein the second electron donor compound is a dialkyl thioether wherein each alkyl group contains from one to ten carbon atoms.

10. The process of claim 9 wherein the dialkyl thioether is di-n-butyl thioether.

* * * * *